(12) United States Patent
Lofgren

(10) Patent No.: US 10,220,545 B2
(45) Date of Patent: Mar. 5, 2019

(54) WATER BASED URETHANE AS PREDIP FOR CARBON FIBER CORD

(71) Applicant: ContiTech Antriebssysteme GmbH, Hannover (DE)

(72) Inventor: Jeffrey Dwight Lofgren, Lincoln, NE (US)

(73) Assignee: ContiTech Antriebssysteme GmbH, Hannover (DE)

( * ) Notice: Subject to any disclaimer, the term of this patent is extended or adjusted under 35 U.S.C. 154(b) by 340 days.

(21) Appl. No.: 15/143,515

(22) Filed: Apr. 30, 2016

(65) Prior Publication Data

US 2017/0312939 A1 Nov. 2, 2017

(51) Int. Cl.
| | |
|---|---|
| *B29B 11/16* | (2006.01) |
| *B29C 35/02* | (2006.01) |
| *B29C 70/08* | (2006.01) |
| *B29C 70/20* | (2006.01) |
| *B29C 70/34* | (2006.01) |

(Continued)

(52) U.S. Cl.
CPC .......... *B29B 11/16* (2013.01); *B29C 35/0227* (2013.01); *B29C 70/083* (2013.01); *B29C 70/086* (2013.01); *B29C 70/20* (2013.01); *B29C 70/34* (2013.01); *B29C 70/545* (2013.01); *B29D 29/08* (2013.01); *C08J 5/06* (2013.01); *D06M 15/564* (2013.01); *F16G 1/08* (2013.01); *F16G 1/28* (2013.01); *F16G 5/06* (2013.01); *F16G 5/20* (2013.01); *B29K 2021/00* (2013.01); *B29K 2075/00* (2013.01); *B29K 2096/00* (2013.01); *B29K 2105/105* (2013.01); *B29K 2105/256* (2013.01); *B29K 2307/04* (2013.01); *B29K 2713/00* (2013.01); *B29L 2031/7094* (2013.01)

(58) Field of Classification Search
CPC .. F16G 1/18; D06M 15/564; B29K 2105/105; B29B 11/16; B29D 29/00; C08J 5/06
See application file for complete search history.

(56) References Cited

U.S. PATENT DOCUMENTS

| | | | |
|---|---|---|---|
| 4,401,713 A * | 8/1983 | Takata | D06M 15/693 427/381 |
| 5,610,217 A | 3/1997 | Yarnell et al. | |

(Continued)

FOREIGN PATENT DOCUMENTS

| | | |
|---|---|---|
| DE | 19963304 A1 | 6/2000 |
| EP | 0892007 A2 | 1/1999 |

(Continued)

OTHER PUBLICATIONS

Machine translation of JP2006-89877 (Year: 2006).*
European Search Report dated Sep. 6, 2017 of EP 17 16 5671 claiming priority this application.

*Primary Examiner* — Scott W Dodds
(74) *Attorney, Agent, or Firm* — David L. Cate

(57) ABSTRACT

Methods of manufacturing a belt include laying up a first elastomeric layer of a belt build on a mandrel, laying up a tensile reinforcement layer on the first elastomeric layer, where the tensile reinforcement layer contains cords coated with a water based urethane compound, and laying up a second elastomeric layer on the first elastomeric layer and the tensile reinforcement layer. The belt build may be cured in a profile-forming mold, and afterward, cut to a predetermined belt width and/or length.

18 Claims, 2 Drawing Sheets

(51) Int. Cl.
*B29C 70/54* (2006.01)
*F16G 1/08* (2006.01)
*B29D 29/08* (2006.01)
*C08J 5/06* (2006.01)
*D06M 15/564* (2006.01)
*F16G 1/28* (2006.01)
*F16G 5/06* (2006.01)
*F16G 5/20* (2006.01)
*B29K 21/00* (2006.01)
*B29K 75/00* (2006.01)
*B29K 96/00* (2006.01)
*B29K 105/10* (2006.01)
*B29K 105/00* (2006.01)
*B29K 307/04* (2006.01)
*B29L 31/00* (2006.01)

(56) References Cited

U.S. PATENT DOCUMENTS

| | | | |
|---|---|---|---|
| 6,419,775 B1 | 7/2002 | Gibson et al. | |
| 6,607,828 B1* | 8/2003 | Hasaka | B32B 25/04 428/369 |
| 6,616,558 B2 | 9/2003 | South | |
| 6,641,905 B1* | 11/2003 | Fujimoto | B29D 29/10 428/297.4 |
| 6,863,761 B2 | 3/2005 | Knutson | |
| 7,025,699 B2 | 4/2006 | Beck | |
| 7,358,294 B2* | 4/2008 | Buckmann | C08F 283/006 524/507 |
| 8,142,316 B2 | 3/2012 | Goettsch et al. | |
| 8,357,065 B2 | 1/2013 | Duke, Jr. et al. | |
| 8,568,260 B2 | 10/2013 | Baldovino et al. | |
| 8,632,650 B2 | 1/2014 | Mori et al. | |
| 8,888,635 B2 | 11/2014 | Mori et al. | |
| 2001/0039226 A1 | 11/2001 | Ito | |
| 2006/0204763 A1 | 9/2006 | Hartman et al. | |
| 2008/0261739 A1 | 10/2008 | Kanzow et al. | |
| 2009/0142572 A1 | 6/2009 | Burlett | |
| 2009/0227406 A1 | 9/2009 | Wu et al. | |
| 2009/0291796 A1* | 11/2009 | Mitsutomi | B29D 29/103 474/252 |
| 2010/0167860 A1 | 7/2010 | Mori et al. | |
| 2010/0173740 A1 | 7/2010 | Mori et al. | |
| 2011/0129647 A1* | 6/2011 | Duke, Jr. | C08G 18/10 428/156 |
| 2017/0145627 A1 | 5/2017 | Sakurai | |

FOREIGN PATENT DOCUMENTS

| | | |
|---|---|---|
| EP | 2899217 A1 | 7/2015 |
| JP | 2006-89877 * | 4/2006 |
| WO | 2009085587 A1 | 7/2009 |

* cited by examiner

WATER BASED URETHANE AS PREDIP FOR CARBON FIBER CORD

FIELD

The field to which the disclosure generally relates is methods of treating tensile cords useful in power transmission belts, as well as the resulting belt, and more particularly to water based polyurethane coated carbon fiber reinforcements used in preparing tensile cords.

BACKGROUND

This section provides background information to facilitate a better understanding of the various aspects of the disclosure. It should be understood that the statements in this section of this document are to be read in this light, and not as admissions of prior art.

In conventional power transmission belts, the belt has an inner compression section, an outer tension section, and an intermediate neutral plane. Typically, helically wound reinforcing cords are located within the neutral plane and so the neutral plane is commonly referred to as the load carrying zone. Such belts have a variety of groove and rib configurations, using longitudinal or transverse grooves/ribs or a combination of both. The grooves are often located in the inner compression section of the belt. The grooves assist in engaging a pulley, or other drive, in the power transmission system. For some belts, grooves and rib configurations may also be provided in the outer tension section.

The generation of adhesion between the reinforcing cords and rubber compounds within the neutral plane and adjacent thereto, in dynamic products such as belts, tires, couplings, or hose is fundamental to their proper operation. Without sufficient adhesion, the product will fail to perform under dynamic conditions. An adhesive system may include many components or layers beginning with a fiber sizing applied to the fibers as they are spun, a primer typically applied to a yarn or greige cord or fabric or other fibrous reinforcement, an adhesive applied to and/or within the cord, and an overcoat applied to the treated cord bundle (or other fibrous reinforcement) to ensure compatibility with the surrounding rubber compound. The treated cord may finally be embedded in or surrounded by an adhesive or gum type rubber composition generally formed from one or more rubber plies or layers making up the body of the belt or other dynamic rubber product.

A conventional treatment for reinforcing cords consists of three coatings: 1) a primer treatment of isocyanate or epoxy in organic solvent; 2) a resorcinol-formaldehyde-latex ("RFL") treatment; and 3) a conventional overcoat adhesive based on a complex blend of chlorinated polymers, curatives, crosslinkers, adhesion promoters, film-formers, and/or acid scavengers, and the like. In some cases, a variation used for aramid cord includes a first polyurethane treatment based on hydroxyl- or epoxy-terminated liquid rubber and isocyanate-terminated liquid rubber, either of which may be a diene rubber, followed by a conventional RFL treatment. Presumably, an overcoat adhesive would also be needed for many applications, such as for bonding to ethylene-alpha-olefin rubber compounds. These are a complex series of treatments that are expensive, may involve some environmentally unfriendly components, and require optimization for best performance.

Developments in the automotive industry have resulted in higher engine output in a more compact engine compartment. As a result, power transmission belts useful for such engines have been required to operate under increasing loads, at even higher tensions, and at high temperatures while reducing belt width. This environment demands a high quality belt capable of withstanding these severe conditions, but which is prepared by less complex processes. Some ways to improve the properties of such belts has been to improve the materials from and techniques by which the belts are made.

SUMMARY

This section provides a general summary of the disclosure, and is not a necessarily a comprehensive disclosure of its full scope or all of its features.

In a first aspect of the disclosure, a method of manufacturing a belt includes laying up a first elastomeric layer of a belt build on a mandrel, laying up a tensile reinforcement layer on the first elastomeric layer, where the tensile reinforcement layer contains cords coated with a water based urethane compound, and laying up a second elastomeric layer on the first elastomeric layer and the tensile reinforcement layer. The belt build may be cured in a profile-forming mold, and afterward, cut to a predetermined belt width and/or length. In some cases, a fabric layer material laid up on the second elastomeric layer. The second elastomeric layer may also be cushion layer disposed on the tensile reinforcement layer, then an insulating layer material thereafter laid up on the cushion layer, and a fabric layer applied on the insulating layer material.

In some aspects, belts prepared may include a plurality of longitudinal grooves and a plurality of longitudinal ribs formed in the second elastomeric layer as the belt build is cured. In some other aspects, the second elastomeric layer includes a plurality of troughs and a plurality of projections orientated perpendicular, or otherwise transverse, to the longitudinal direction of the belt, and the troughs and projections are formed during curing the belt build.

The tensile reinforcement layer may include fiber cords, which are carbon fiber cords. The cords may be further dipped in a RFL suspension, and also a final dip through a rubber based polymer to provide an overcoat. In some cases, the cords are coated by dipping in a tank containing a polyurethane emulsion stabilized with internal anionic and external nonionic species, and the polyurethane emulsion is substantially free of polyurea functional groups, and/or isocyanate functional groups.

In another aspect of the disclosure, methods involve providing a plurality of cords, dipping the plurality of cords a first tank containing a polyurethane emulsion stabilized with internal anionic and external nonionic species, dipping the plurality of cords a second tank having a RFL suspension, and dipping the plurality of cords a third tank containing a rubber based polymer, to thus provide a plurality of treated cords. In another stage of the methods, a first elastomeric layer is provided, and the plurality of treated cords are laid upon the first elastomeric layer to form tensile reinforcement layer. A second elastomeric layer applied onto the tensile reinforcement layer, and the combination of the first elastomeric layer, the tensile reinforcement layer and the second elastomeric layer are cured in a profile-forming mold. The cured combination of the first elastomeric layer, the tensile reinforcement layer and the second elastomeric layer may then be cut to provide a belt with a predetermined width and/or length. Also, the plurality of cords may be helically wound when forming the tensile reinforcement layer.

Yet another aspect provides methods of preparing a tensile reinforcement layer for manufacturing a belt, by providing a plurality of cords, and dipping the plurality of cords in a polyurethane emulsion stabilized with internal anionic and external nonionic species. The plurality of cords may then be dipped in a tank containing a RFL suspension, and then dipped in a tank containing a rubber based polymer, to provide a plurality of treated cords. Methods may further include laying up a first elastomeric layer of a belt build on a mandrel, laying up the tensile reinforcement layer on the first elastomeric layer, and laying up a second elastomeric layer on the first elastomeric layer and the tensile reinforcement layer. The combination of the first elastomeric layer, the tensile reinforcement layer and the second elastomeric layer may then be cured in a profile-forming mold to provide a belt build, and afterward, cut to a predetermined belt width and/or length. The pickup percentage may be from about 15% to about 25% by weight, as compared from before dipping the plurality of cords to after dipping the plurality of cords.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
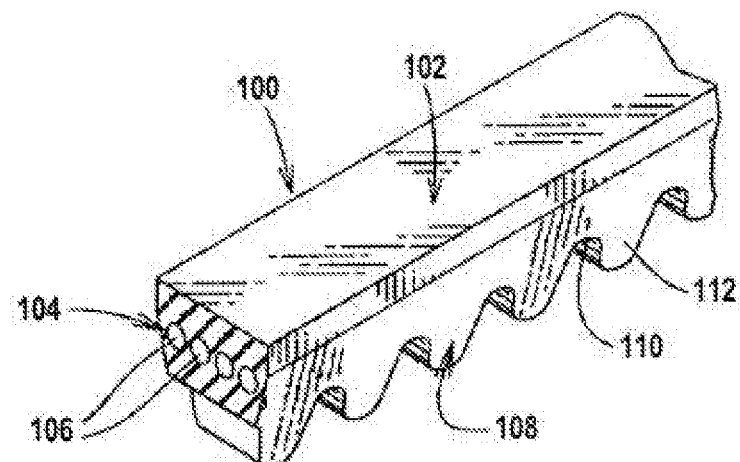
FIG. 1 is a fragmented perspective view, with parts in section, of a V-belt constructed in accordance with an embodiment of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range or dimension listed or described as being useful, suitable, or the like, is intended that any and every concentration or amount or dimension within the range, including the end points, is to be considered as having been stated. For example, "a range of from 1 to 10" is to be read as indicating each and every possible value along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the present disclosure are related to power transmission belts and methods of manufacturing such as well as components used therein. The belts contain components providing the belts with improved properties in regards to belt growth, wicking, abrasion, and durability. In some embodiments, the belts disclosed include a body portion, a tensile reinforcement layer having cords disposed within main body portion (which may contain components readily known to those in the art), and a contact portion positioned along the inner periphery of main body portion. In some embodiments, belts include a body portion having a tension section or backing or jacket, a cushion or compression section, a tensile reinforcement layer disposed within the body, and an optional fabric layer adhered to a drive surface. In some aspects, the belt may have an insulation layer located between the cushion section and the fabric layer to prevent or decrease rubber from the cushion section from permeating through the fabric to the drive surface. Some materials useful in preparing the tensile reinforcement layers include, but are limited to, tensile cords (also referred to as filaments, or tows), which are dipped in a water based urethane compound, then a RFL (resorcinol/formaldehyde/latex) material, followed by a rubber based overcoat.

Some cords used in forming the tensile reinforcement layer in some embodiments, are treated in a three dip process, consisting of a first dip in a water solution and/or dispersion of a polyurethane polymer (also referred to as water based polyurethane), a second dip in a RFL suspension, and a final dip through a rubber based polymer to provide an overcoat. In some embodiments, single cords are dipped in the water based polyurethane, a plurality of the dipped cords then twisted together and dipped in RFL, then an overcoat dip is performed. In some other aspects single cords are twisted together and dipped in the water based polyurethane, dipped in RFL, then dipped in an overcoat. It is within the scope of the disclosure that a plurality of cords are dipped in a first tank containing a water based polyurethane notwithstanding the particular stage of the process where individual cords are twisted, as necessary, whether before or after dipping in the water based polyurethane.

After the cords are treated in the three dip process, the cords may in some cases, be helically wound onto a mandrel with other belt body forming components, and vulcanized using any suitable method, for example in an autoclave process. When an autoclave process is used, the temperature used may be from about 300 to about 400 deg F., from about 325 to about 375 deg F., or even from about 340 to about 350 deg F. Afterward, the cords are used in the tensile reinforcement layer as the belt is built. In some other embodiments, cords are treated in a one dip process which includes the water based polyurethane polymer. It is believed that use of such one to three dip processes, with a first dip in an aqueous solution and/or suspension of a polyurethane polymer, improves the tensile strength of the cord, in some aspects formed from carbon fibers, by up to 30%, and improves the uniformity of the cord bundle. The new dip process may also improve fiber to fiber cohesion, and flex fatigue resistance, as well as cord and tensile reinforcement layer cuttability and fray resistance.

With regards to the water based polyurethanes useful in embodiments of the disclosure, the general term "polyurethane" may be commonly used in the art to include polyureas, polyisocyanurates, polyisocyanates, isocyanates and other polymers, which in some cases, may have little or no actual urethane groups. Herein, however, "polyurethane" is used in a more literal sense to refer to polymers, which are reaction products of isocyanates and alcohols, and thus contain significant amounts of urethane groups, —NH—CO—O—. While it is common place to use an isocyanate or polyisocyanate in one or more of the dip bath processes when treating the cords, embodiments according to the disclosure eliminate the complexity and common issues associated with the use of such an isocyanate or polyisocyanate, since the polyurethane has urethane groups already formed from isocyanate and alcohol groups, and is free of residual isocyanate functional groups. The term "polyurea" is used herein to refer to polymers which are reaction products of isocyanates with themselves in the presence of moisture or water, or reactions of isocyanates with amines which may be reaction intermediates, resulting in significant amounts of urea groups, —NH—CO—NH—. It is believed that no significant amount of urea groups is formed in the dip bath processes according to the disclosure.

Water based polyurethanes suitable for use in some embodiments of the disclosure include any emulsifiable, or otherwise solvatable or dispersible, polyurethane polymers, such as elastomeric, cross-linkable polyurethanes. Water based polyurethane emulsions typically include an aqueous medium which can contain water and in some cases, other nonaqueous co-solvents. In some aspects, suitable polyurethanes for use can include any aliphatic or aromatic water-based polyurethanes that can produce tensile reinforcement layers having higher tensile strength, uniformity of the cord bundle, increased fiber to fiber cohesion, improved flex fatigue resistance, as well as cord and tensile reinforcement layer cuttability and fray resistance. Some non-limiting examples of useful polyurethanes include aqueous dispersions of polyurethane, such as WITCOBOND W-290H and WITCOBOND W-296, both of which are commercially available from Crompton Corporation-Uniroyal Chemical, and Aquathane 516, available from Reichhold Chemical Company. In some embodiments, a useful aqueous dispersion of polyurethane is HYDROSIZE U2-01, commercially available from Michelman, Inc., Cincinnati, Ohio, which is a polyurethane emulsion stabilized with internal anionic and external nonionic species.

In forming the tensile reinforcement layer, in some embodiments, a first dip is conducted by first adding a water based polyurethane emulsion to a dip tank at a predetermined concentration which may provide a tank solids content of about 1 to about 50% by weight, or from about 5% to about 40% by weight. The cord, which may be in multifilament twisted form, e.g. from about 0.75 to about 2.5 turns per inch for carbon fiber cord, is pulled though the dip tank and then through an oven, where, the aqueous medium (containing water and other emulsion containing co-solvents) is substantially flashed off. Alternately, the cord in single filament form may be dipped and dried in untwisted form, with means to spread the fibers for maximum penetration, followed by twisting. While using an oven is described for flashing off aqueous medium, any suitable energy source for flashing may be useful. Further, while the energy absorbed may sufficient for adequately flashing off the aqueous medium, it is within the spirit and scope of the disclosure that such energy is not used for curing, or otherwise promoting any covalent reaction of components in, the polyurethane.

In some embodiments, the water based polyurethane solids level is balanced with adequately low viscosity to fully penetrate cord bundle during the dip treatment whether twisted or not. After drying, the polyurethane sufficiently coats the individual cords of the bundle, but need not completely fill the interstices formed between cords. It may be advantageous for the polyurethane to occupy from about 20% to about 99% or 100% of the interstices, depending on the intended use of the treated cord. In particular, for use in cast polyurethane articles such as power transmission belts, only partially filling the interstices, e.g., from 20% to 90%, or 30% to 80% full, or 40% to 60% full, may leave interstices or voids that can be penetrated by other materials forming the belt body, thus providing a level of mechanical adhesion without making the cord overly stiff and still benefiting from the use of the polyurethane treatment. When a cast belt body thus penetrates the interstices in the polyurethane treated cords, the materials may be in intimate contact, facilitating chemical bonding between them. On the other hand, when the cord is to be overcoated with additional materials in subsequent dip processes, more fully impregnated cord may be more suitable, e.g., from 40% to 100%, or 60% to 99% full. In some aspects, the pickup levels, indicated for example as weight % adhesive pickup based on weight of the treated cord, may vary depending on the degree of voids within interstices in the cords. The pick up level of the polyurethane on the cord may be in the range from about 5% to about 50%, about 5% to about 40%, about 8% to about 40%, about 10% to about 40%, or in some aspects, from about 15% to about 25% by weight, as compared from before dipping to after dipping in the one or more dipping processes.

Now referring to FIG. 1, where a standard notched V-belt 100 is illustrated therein. V-belt 100 includes an elastomeric body portion 102 and tensile reinforcement layer 104 in the form of a plurality of cords 106, where cords 106 are aligned longitudinally along the length of main body portion 102. Tensile reinforcement layers, may also serve as load-carrying sections in embodiments of the disclosure. Tensile reinforcement layer 104 is positioned within main body portion 102 for providing support and strength to belt 100. It should be understood that, in general, any type of tensile reinforcement layer 104 known to the art may be utilized. Moreover, any desired material may be used as the tensile member, such as cotton, rayon, polyamide, polyester, aramid, steel, glass, carbon, PBO, polyketone, basalt, boron, and even discontinuous fibers oriented for low load carrying capability. In the embodiment of FIG. 1, as well as other embodiments of the disclosure, tensile reinforcement layer 104 includes tensile cords 106 made from one or more yarns of high-modulus fiber, twisted or plied together into a cord and treated with the water based polyurethane treatment described herein. Some useful high-modulus fibers include those produced from aramid, fiberglass, nylon, polyester, cotton, steel, carbon fiber and polybenzoxazolepolyethylene naphthalate (PEN), poly(p-phenylene-2,6-benzobisoxazole) (PBO), basalt, boron, or liquid crystal polymer (LCP). In some embodiments, the cords 106 comprise aramid or carbon fiber. In some aspects, the cord may be a twisted filament yarn, or a twisted bundle of yarns of continuous carbon fiber filaments. In some cases, the tensile reinforcement layer 104 may optionally include an elastomeric composition or rubber material that is different than the rest of the main body portion in order to provide a transitional layer in terms of modulus or other property and/or to function as an adhesive layer between cord and main body. The optional adhesive rubber member may for example be of higher modulus than the main body as described in U.S. Pat. No. 6,616,558 to South, the contents of which are hereby incorporated herein by reference.

V-belt 100 also includes sheave contact portion 108 positioned along the inner periphery of main body portion 102. In this embodiment, however, sheave contact portions 108 are the two juxtaposed sides of the belt, designed to wedge into a V-sheave. The bottom surface of V-belt 100 is in the form of alternating notch depression surfaces or troughs 110 and projections 112 orientated perpendicular to the longitudinal direction of the belt. These alternating notched depression surfaces 110 and projections 112 may follow a generally sinusoidal path as illustrated which serves to distribute and minimize bending stresses as the sheave contact portion 108 passes around pulleys and sheaves. Various notch profiles that deviate from sinusoidal in various ways are also useful. However, troughs 110 and projections 112 are optional. Included in the category of V-belts are those V-belts designed for continuously variable transmission ("CVT") applications, which often exhibit a belt body relatively wider than the belt thickness.

Figure 2:
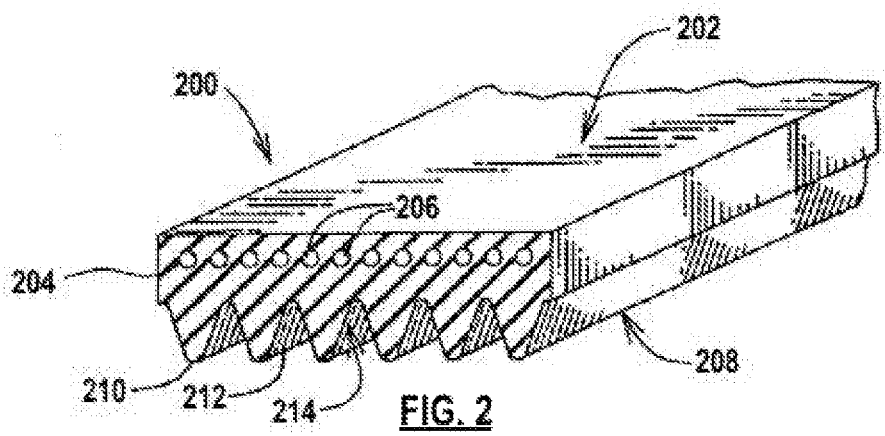
FIG. 2 is a fragmented perspective view, with parts in section, of a multi-V-ribbed belt constructed in accordance with an embodiment according to the disclosure.

Now referring to FIG. 2, where multi-V-ribbed belt 200 is illustrated. Multi-V-ribbed belt 200 includes main elastomeric body portion 202 as in the belts of FIG. 1, and also includes tensile reinforcement member 204 in the form of cords 206, also as previously described. Longitudinally grooved sheave contact portion 208 is in the form of a plurality of raised ribs, or apexes, 210 alternating with a plurality of grooves 212 having oppositely facing sides which define driving surfaces 214 of the belt 200. In each of the instances of FIGS. 1 through 5, described herein above and below, sheave contact portion, such as 208, is integral with main body portion, such as 202, and may be formed from the same elastomeric material to be described in greater detail below, or layered of different material. The tensile reinforcement member 204, and cords 206 of belt 200 may be constructed from the same or similar materials as described above for FIG. 1, or any other suitable materials.

Figure 3:
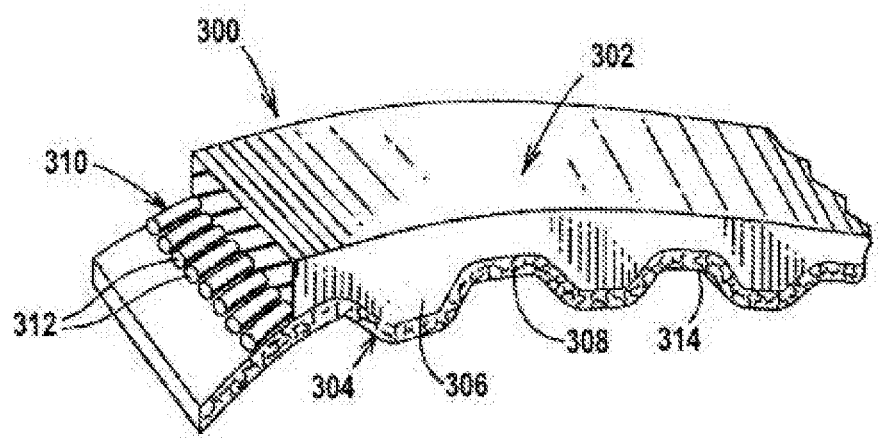
FIG. 3 is a fragmented perspective view, with parts in section, of a belt constructed in accordance with an embodiment according to the disclosure.

With reference to FIG. 3, another belt embodiment, 300, such as a timing belt, is illustrated. Belt 300 includes elastomeric main body portion 302 and sheave contact portion 304 positioned along the inner periphery of main body portion 302. This particular sheave contact portion 304 is in the form of alternating transverse teeth 306 and land portions 308 which are designed to mesh with a transverse-grooved pulley or sprocket. Tensile reinforcement layer 310 is positioned within main body portion 302 for providing support and strength to belt 300. In the illustrated form, tensile reinforcement layer 310 is in the form of a plurality of tensile cords 312 aligned longitudinally along the length of main body portion 302. The tensile reinforcement layer 310, and cords 312 of belt 300 may be constructed from the same materials as described above for FIG. 1.

In some cases, reinforcing fabric 314 may be utilized fittingly along the alternating teeth 306 and alternating land portions 308 of belt 300 to form a face cover or tooth cover for the sheave contact portion. This fabric may be of any desired configuration such as a conventional weave consisting of warp and weft threads at any desired angle or may consist of warp threads held together by space pick cords, or of a knitted or braided configuration, or a nonwoven fabric, and the like. More than one ply of fabric may be employed, or combinations of different fabric types. If desired, fabric 314 may be cut on a bias so that the strands form an angle with the direction of travel of the belt. Conventional fabrics may be employed using such materials as cotton, polyester, polyamide, acrylic, aramid, polyketone, hemp, jute, fiberglass, and various other natural and synthetic fibers including blends or combinations thereof. In an embodiment of the disclosure, fabric layer 314 consists of an expansible wear-resistant fabric in which at least one of the warp or weft threads is made of nylon. In some cases, fabric layer 314 is made from a nylon 66 stretch fabric, and presents an elastomer-free (polyurethane/urea-free) surface for engaging cooperating drive sheaves. The elastomer-free surface may include a polymeric film laminated to the fabric. The fabric may also be treated with the water based polyurethane treatment described herein.

Figure 4:
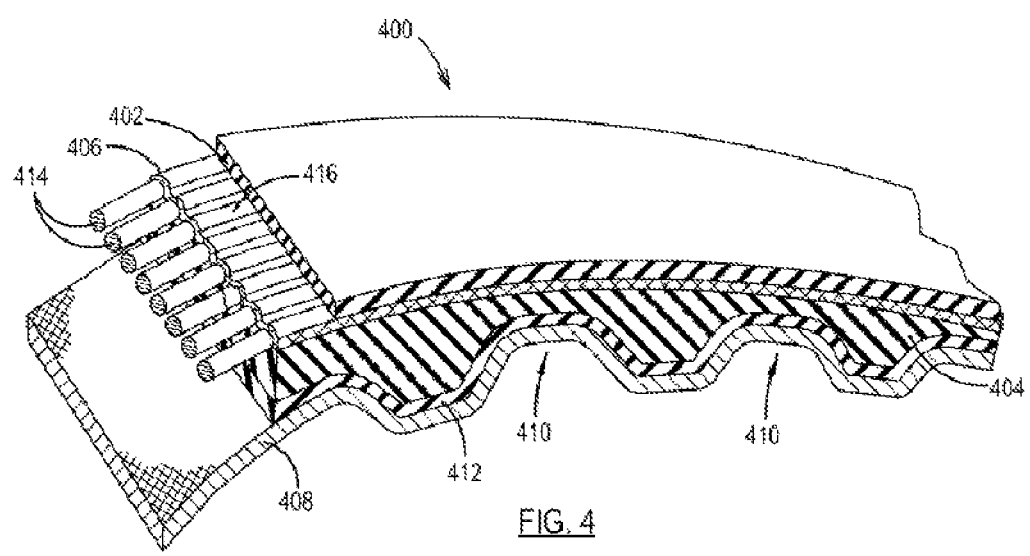
FIG. 4 is a fragmented perspective view, with parts in section, of a synchronous drive belt constructed in accordance with an embodiment according to the disclosure; and, FIG. 5 is a fragmented perspective view, with parts in section, of a timing v-belt constructed in accordance with an embodiment according to the disclosure.

FIG. 4 illustrates an endless power transmission belt 400. The belt 400 is particularly adapted to be used in associated sheaves in accordance with techniques known in the art. The belt is particularly suited for use in synchronous drive applications. The belt 400 may be adapted to be used in so-called torque sensing drives, application where shock loads of varying belt tension are imposed on the belt, applications where the belt is operated at variable speeds, applications where the belt is spring-loaded to control its tension and the like. Belt 400 includes a body having a tension section or backing 402, a cushion, or compression, section 404, a tensile reinforcement layer 406 disposed between the tension section 402 and cushion section 404, and a fabric layer 408 adhered to drive surface 410. The belt may have an insulation layer 412 located between the cushion section 404 and the fabric layer 408 to prevent or decrease rubber from the cushion section 404 from permeating through the fabric 408 to the drive surface 410.

In the embodiment shown in FIG. 4, there is one drive surface 408 having a fabric layer 406. In accordance with other embodiments, the belt 400 may have multiple drive surfaces of two or more. A fabric layer may also be on the non-drive outer surface of the belt. The fabric layer 406 may be made from a woven, non-woven or knitted fabric. Some useful fabrics in accordance with the disclosure include conventional materials such as nylon (such as nylon 4, 6, nylon 6, 6 and nylon 6), cotton, polyester, cotton/polyester, nylon/polyester, cotton/nylon, Lycra™ (segmented polyurethane), aramid, rayon and the like. In some embodiments, the fabric is made of nylon 6, 6. The tensile reinforcement layer 406 has load-carrying means in the form of load-carrying filament or cords 414 embedded in a compound 416. The cords may be transverse or parallel to the length of the belt, or any suitable orientation. The cords 414 or filaments may be made of any suitable material, examples of which include, but are not limited to aramid, fiberglass, nylon, polyester, cotton, steel, carbon fiber, polybenzoxazole, and the like, as well as any other suitable materials described herein. The drive surface 408 of the belt 400 of FIG. 400 is synchronous. In accordance with other embodiments, the belts of the present invention also include those belts where the drive surface of the belt may be smooth, single V-grooved, and multi-V-grooved. Representative examples of synchronous include belts having trapezoidal or curvilinear teeth.

The elastomers for use in the tension section 402 and the compression section 404 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrile butadiene elastomers, styrene-butadiene rubbers, polybutadiene, ethylene propylene diene monomer rubber (EPDM), hydrogenated acrylonitrile-butadiene copolymers (HNBR), polyurethane, and ethylene-acrylic elastomers. The insulation layer 410 may in some cases be a blend of an elastomer and a thermoplastic. The elastomer component of the insulation layer 410 is selected from conventional elastomers used in manufacturing belts and includes, but is not limited to, the list of elastomers set forth above in the discussion of elastomers for use in the tension section 402 and compression section 404 of the belt 400. Some suitable examples of the elastomers are butadiene copolymers such as polybutadiene, NBR, and HNBR.

Figure 5:
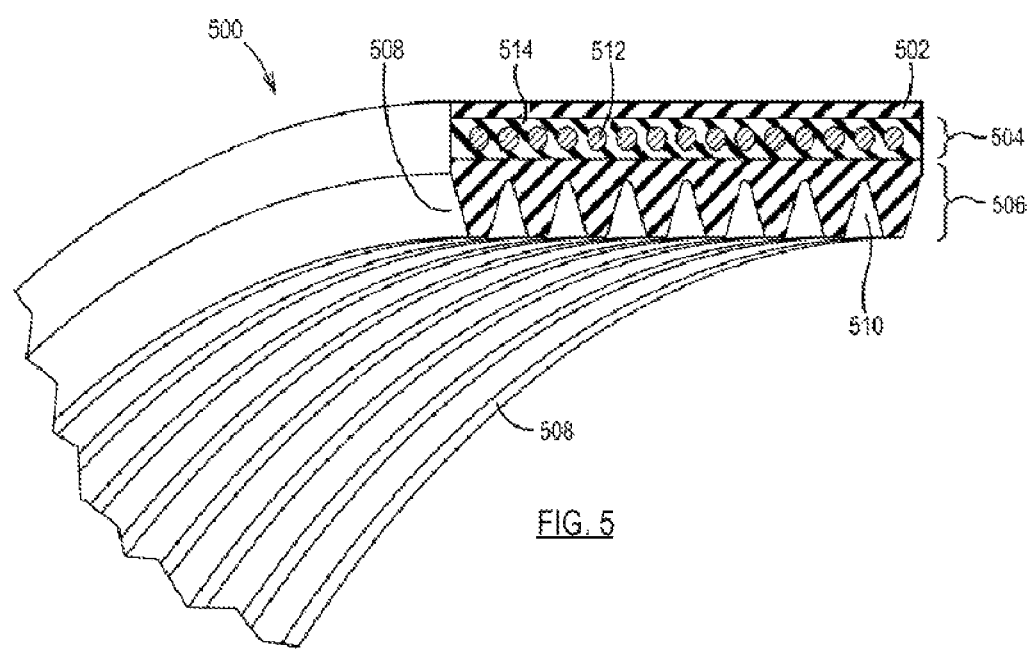

Now referencing FIG. 5, which illustrates a poly-v belt 500. The belt 500 has a body including tension section 502, a tensile reinforcement layer 504, and compression section 506. The compression section 506 has a plurality of longitudinal ribs 508 with a plurality of longitudinal grooves 510. The tensile reinforcement layer 504 has longitudinal reinforcing cords 512 embedded in a suitable material 514, described in further detail below. In some aspects, the compression section may be provided with an additional layer formed of an elastomeric/thermoplastic material.

With regards to fibers used in forming tensile reinforcement layers in embodiments of the disclosure, some useful fibers are aramid fibers which are long chain synthetic polyamide having amide linkages attached directly to two aromatic rings in either the para or meta position. Use may be made, for example, of PPD-T, polyp-benzamide), copoly(p-phenylene/3,4'-oxydiphenylene terephthalamide), or the like. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. Commercial aramid fibers suitable for use in some embodiments of the disclosure include those sold under the trademarks TEIJIN-CONEX, TECHNORA, and TWARON by Teijin Limited, and under the trademarks NOMEX, and KEVLAR by E.I. DuPont de Nemours and Company.

In some other aspects, fibers used in forming the tensile reinforcement layers, are carbon fibers. Carbon fiber is typically made by carbonizing another fiber such as polyacrylonitrile fiber, wherein during the carbonizing process the diameter of the fiber is substantially reduced. Carbon yarn is generally characterized by the number of fibers contained therein rather than by denier or dtex. A nomenclature of numbers and the letter "k" are used to denote the number of carbon fibers in a yarn. Of course, carbon fiber may be characterized by such other terms where desired. In a "3 k" carbon fiber yarn, the "k" is an abbreviated designation for "1000 fibers," and the "3" designates a multiplier. Thus "3 k" carbon yarn identifies a yarn of 3000 fibers or filaments. The filaments are generally of sufficient length to be considered continuous. Like other textile materials, a number of carbon fibers are combined to form a yarn. A yarn may be combined with other yarn to form a larger yarn, and the yarn or yarn bundles may be twisted together to form a cord. Carbon fiber may have an extremely small diameter, which may be in the range of from about 4 to about 8 microns, or about 5 to 7 microns. Individual fibers are easily fractured when a yarn is processed to form a cord. For this reason, it is desirable to minimize the number of mechanical operations that the yarn is subject to when forming a cord. For example, twisting several yarns together to form a yarn bundle and reverse twisting the so plied yarn bundles to form a cord are mechanical operations that fracture individual fibers. The number of fractures are lessened by reducing the number of twisting operations. To form a desired cord size may include bundling together multiple yarns of smaller filament count, for example, five 3 k yarns to obtain 15 k (designated 3 k-5), or three 6 k yarns to obtain 406 k cord (designated 6 k-3). Preferably the twist level is not too high so as not to damage fibers. Thus a preferred twist level is from 0.75 to 2.5 turns per inch, or up to about 2 turns per inch. The final carbon fiber bundle may be from 3 k to 60 k, depending on the desired application.

Fiber manufacturers often coat fibers with a sizing which acts to lubricate the fiber and inhibit fracturing as the fiber is processed into yarns and wound on spools. In some instances, the sizing may have a chemical structure that is compatible with an adhesive used to treat a cord for inclusion into a power transmission belt. Types of sizing used by carbon fiber manufacturers include for example epoxies, blends of epoxy with polyurethane, organosiloxanes, polyamide-imides, and others. Sizing may be present at a pickup weight of about 0.1 to about 2.5% based on the yarn final weight. It is believed that embodiments of the disclosure described herein are not particularly sensitive to the type or level of sizing which may be present on the carbon fiber. It may be that the primary mode of bonding of the polyurethane treatment to the carbon fiber bundle is physical interlocking rather than chemical bonding.

In each of the embodiments illustrated in FIGS. 1-5 above, belt body portions may be formed of any conventional and/or suitable cured elastomer composition, and may be of the same as or different from that described below in relation to the optional adhesive rubber member comprising tensile reinforcement layers. Suitable elastomers that may be utilized for this purpose include for example polyurethane elastomers (including as well polyurethane/urea elastomers and so-called millable gums) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), polyepichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

In preparing the elastomeric belt (or other articles) body portions, in accordance with some embodiments of the disclosure, the elastomer(s) may be blended with conventional rubber compounding ingredients including fillers, plasticizers, stabilizers, vulcanization agents/curatives and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate and/or zinc diacrylate may be utilized in such compositions in amounts of from about 1 to about 50 pounds per hundred pounds of elastomer (phr); or alternatively of from about 5 to about 30 phr; or of from about 10 to about 25 phr. These materials furthermore contribute to the adhesiveness of the composition, and increase the overall cross-link density of the polymer upon curing with peroxide or related agents through ionic crosslinking. Further, any number of suitable compositions for utilization in or as the elastomeric portions of the rubber articles useful herein, may be used, and could be selected from elastomer compositions described for example in The R. T. Vanderbilt Rubber Handbook (13th ed., 1996), and in U.S. Pat. No. 5,610,217, the contents of which, are incorporated herein by reference. In an embodiment of the disclosure, associated with automotive accessory drive applications, the elastomeric belt body portions 12 may be formed, in some case, of a suitable ethylene alpha olefin composition, such as an EPM, EPDM, EBM or EOM composition.

The main belt body portions may, in some aspects, include discontinuous fibers as is well known in the art, utilizing materials such as including but not limited to cotton, polyester, fiberglass, aramid and nylon, in such forms as staple or chopped fibers, flock or pulp, in amounts generally employed. In some embodiments, relating to profiled (e.g., as by cutting or grinding) multi-v-ribbed belts, such fiber loading is formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

In some aspects of the disclosure, belts are built up on a mandrel in a series of layers. A tension section, or backing, such as 402 in FIG. 4, or other jacket if present, is laid up first on the mandrel. A tensile reinforcement layer, such as those described above, of the belt is laid-up thereover next. Other optional intermediate layers as desired, may be laid next, such as, but not limited to, a cross-cord, an overcord layer, and the like. An elastomeric layer is then applied over the tensile reinforcement layer, or other optional layers, and this may include one or more layers of elastomeric material. The elastomeric layer may be used for forming such features as sheave contact portion is in the form of alternating transverse teeth and land portions positioned along the inner periphery of main belt body, in some cases, while in others aspects, plurality of raised areas or apexes alternating with a plurality of trough areas, or other structures described hereinabove. The final layers optionally applied to the build upon the elastomeric layer are insulation and fabric layers.

The belt build is then subjected to curing pressures and temperatures sufficient to vulcanize and mold the belt, as is well known in the art. For example, the fabrication process may include evacuating the air from inside the mold, applying steam pressure on the outside shell to a range of about 175 to 235 psig (about 1.2 to 1.62 MPa) for about 2 to 10 minutes, then applying steam pressure on the inside of the mold to a range of about 85 to 210 psig (about 0.59 to 1.45 MPa), and curing for about 10 to 20 minutes. Once cooled, the cured belt build is then separated from the mandrel and cut to the appropriate belt widths. The optimum rib shapes may be achieved with process pressures on the high end of the range. Hydraulics or other methods known in the art (pneumatic, mechanical, and the like) can also be used to apply pressure to the belt, in conjunction with concurrently applied electric heat for curing in lieu of steam cure. The pressure range for a hydraulic cure may be about 85 to 500 psig (about 0.59 to 3.45 MPa). The temperature range may be about 250 to 500° F. (about 120 to 260° C.). This method of curing broadens the choice of rubber stocks to include many with relatively poor scorch safety and/or relatively high viscosity.

Application of pressure prior to curing may infuse the elastomeric subsurface material into the tensile reinforcement layer while forming the profile. The elastomeric material then occupies some of the interstitial space between the individual fibers contained in the cords of the tensile reinforcement layer. This results in a region of the tensile reinforcement layer wherein the layer is co-mingled and interpenetrated with the elastomeric material.

While some aspects of the disclosure are illustrated with reference to the embodiments shown in FIGS. 1-5, it should be understood that the disclosure is not to be limited to these particular embodiments or forms as illustrated but rather is applicable to any belt construction within the scope of the claims as defined below. Further, embodiments may have the general form of the toothed belts described above, which is an endless belt, either as molded or by joining two belt ends together. In some other cases, embodiments may have two ends, which may be clamped to various associated mechanisms, for example, in conveying, transporting, holding, or positioning applications. Also, belts may be made by known methods, including continuous lamination methods that produce belts having two ends, instead of endless belts. The two ends may be joined according to known methods to make endless belts. Rubber belts may be built on a mandrel, cured, and cut to width according to methods known in the art.

It should be understood that reinforcing cords according to an embodiment of the invention may be used in various kinds of elastomeric composite articles, such as power transmission belts, transport or transfer belts, straps, tires, hose, air springs, vibration mounts, etc. Also, materials described in forming any of the embodiments illustrated, or components thereof, may be useful in any of the other embodiments and components illustrated, as deemed appropriate.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of manufacturing a belt comprising:
    laying up a first elastomeric layer of a belt build on a mandrel;
    laying up a tensile reinforcement layer on the first elastomeric layer, wherein the tensile reinforcement layer comprises cords coated with a water based urethane compound;
    laying up a second elastomeric layer on the first elastomeric layer and the tensile reinforcement layer;
    curing the belt build in a profile-forming mold; and
    cutting the belt build to predetermined belt widths and/or lengths;
    wherein the water based urethane compound is a dispersion of polyurethane polymer;
    wherein the cords are twisted together at a rate of from 0.75 to 2.5 turns per inch before being coated with the water based urethane compound; and,
    wherein the cords are further coated with a resorcinol-formaldehyde-latex suspension, and a final dip through a rubber based polymer to provide an overcoat.

2. The method of claim 1 further comprising laying up a fabric layer material on the second elastomeric layer.

3. The method of claim 1 wherein the second elastomeric layer is a cushion layer disposed on the tensile reinforcement layer.

4. The method of claim 3 further comprising laying up an insulating layer material on the cushion layer.

5. The method of claim 4 further comprising laying up a fabric layer on the insulating layer material.

6. The method of claim 1 wherein the second elastomeric layer comprises a plurality of longitudinal ribs and a plurality of longitudinal grooves formed therein after curing the belt build.

7. The method of claim 1 wherein the second elastomeric layer comprises a plurality of troughs and a plurality of projections orientated perpendicular to the longitudinal direction of the belt, the troughs and the projections formed therein after curing the belt build.

8. The method of claim 1 wherein the tensile reinforcement layer comprises carbon fiber cords.

9. The method of claim 1 wherein the cords are coated by dipping in a tank comprising a polyurethane emulsion stabilized with internal anionic and external nonionic species.

10. The method of claim 9 wherein the polyurethane emulsion is substantially free of polyurea functional groups.

11. The method of claim 9 wherein the polyurethane emulsion is substantially free of isocyanate functional groups.

12. The method of claim 9 where pickup percentage is from about 5% to about 40% by weight, as compared from before dipping the cord to after dipping the cord in the dipping process.

13. A method comprising:
    providing a plurality of cords;
    twisting the plurality of cords together at a rate of from 0.75 to 2.5 turns per inch;
    after the twisting the plurality of cords together, then dipping the plurality of cords in a first tank comprising a polyurethane emulsion stabilized with internal anionic and external nonionic species, dipping the plurality of cords a second tank comprising a resorcinol-formaldehyde-latex suspension, and dipping the plurality of cords a third tank comprising rubber based polymer, to provide a plurality of treated cords;
    providing a first elastomeric layer;
    laying up the plurality of treated cords on the first elastomeric layer to form a tensile reinforcement layer;
    laying up a second elastomeric layer on the tensile reinforcement layer; and,
    curing the combination of the first elastomeric layer, the tensile reinforcement layer and the second elastomeric layer in a profile-forming mold.

14. The method of claim 13 further comprising cutting the cured combination of the first elastomeric layer, the tensile reinforcement layer and the second elastomeric layer to provide a belt with a predetermined width and/or length.

15. The method of claim 13 wherein the plurality of cords are carbon fiber cords.

16. The method of claim 13 wherein the plurality of cords are helically wound in forming the tensile reinforcement layer.

17. The method of claim 13 wherein pickup percentage is from about 5% to about 40% by weight, as compared from before dipping the plurality of cords to after dipping the plurality of cords in the first, second and third tanks.

18. The method of claim 13 wherein the polyurethane emulsion is substantially free of isocyanate functional groups.

* * * * *